United States Patent

Yoshitomi et al.

(10) Patent No.: US 9,852,626 B2
(45) Date of Patent: Dec. 26, 2017

(54) VEHICLE DRIVING ASSISTANCE APPARATUS AND VEHICLE DRIVING ASSISTANCE METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Naoto Yoshitomi, Kariya (JP); Jian Hu, Kariya (JP); Shota Satomura, Kariya (JP); Yusuke Fujimaki, Nisshin (JP)

(73) Assignees: DENSO CORPORATION, Kariya, Aichi-pref. (JP); TOYOTA JIDOSHA KABUSHIKI KAISHA, Toyota-shi, Aichi-pref. (JP)

( * ) Notice: Subject to any disclaimer, the term of this patent is extended or adjusted under 35 U.S.C. 154(b) by 20 days.

(21) Appl. No.: 15/166,767

(22) Filed: May 27, 2016

(65) Prior Publication Data

US 2016/0351052 A1    Dec. 1, 2016

(30) Foreign Application Priority Data

May 29, 2015    (JP) .................... 2015-110565

(51) Int. Cl.
*G08G 1/0962* (2006.01)
*B60Q 9/00* (2006.01)

(52) U.S. Cl.
CPC .......... *G08G 1/09623* (2013.01); *B60Q 9/00* (2013.01); *G08G 1/09626* (2013.01)

(58) Field of Classification Search
CPC ... G08G 1/09623; G08G 1/09626; B60Q 9/00
See application file for complete search history.

(56) References Cited

U.S. PATENT DOCUMENTS

| 5,926,117 A * | 7/1999 | Gunji .................... G01S 19/04 340/988 |
| 9,008,952 B2 * | 4/2015 | Caskey .................. G08G 1/00 701/117 |
| 9,208,691 B2 * | 12/2015 | Borland .................. G08G 9/00 |
| 9,550,496 B2 * | 1/2017 | Suzuki ............. B60W 30/18163 |

(Continued)

FOREIGN PATENT DOCUMENTS

WO    WO 2011/078845 A1 *    6/2001    ............. G08G 1/017

*Primary Examiner* — Calvin Cheung
(74) *Attorney, Agent, or Firm* — Knobbe, Matens, Olson & Bear, LLP

(57) ABSTRACT

In a driving assistance apparatus, a start determiner determines whether or not during travel in a no-passing zone an own vehicle has laterally moved from a rearward position to a lateral position relative to the preceding vehicle, and if the own vehicle has laterally moved, then determine that the own vehicle has started passing driving. If the own vehicle has started passing driving in the no-passing zone, an alert controller starts alerting using an alert device at a start of passing driving. A situation determiner determines whether or not a change of situation from a blocking situation to a non blocking situation has occurred after the start of passing driving. If the change of situation from the blocking situation to the non blocking situation has occurred, an alerting stopper stops alerting using the alert device.

8 Claims, 2 Drawing Sheets

(56) References Cited

U.S. PATENT DOCUMENTS

| | | | |
|---|---|---|---|
| 2005/0246096 A1* | 11/2005 | Bracht | B60Q 1/143 |
| | | | 701/431 |
| 2007/0177014 A1 | 8/2007 | Frenzel et al. | |
| 2010/0315217 A1 | 12/2010 | Miura et al. | |
| 2011/0313665 A1* | 12/2011 | Lueke | G01S 13/931 |
| | | | 701/301 |
| 2015/0213319 A1 | 7/2015 | Frenzel et al. | |
| 2015/0215550 A1 | 7/2015 | Frenzel et al. | |

* cited by examiner

VEHICLE DRIVING ASSISTANCE APPARATUS AND VEHICLE DRIVING ASSISTANCE METHOD

CROSS-REFERENCE TO RELATED APPLICATION

This application is based on and claims the benefit of priority from earlier Japanese Patent Application No. 2015-110565 filed May 29, 2015, the descriptions of which are incorporated herein by reference.

BACKGROUND (Technical Field)

The present invention relates to a vehicle driving assistance apparatus and a vehicle driving assistance method.

(Related Art)

Conventionally, various vehicle driving assistance techniques have been proposed for assisting a driver in driving his or her own vehicle. For example, a known technique as disclosed in Japanese Patent Application Laid-Open Publication No. 2010-287162 is configured to detect a passing behavior of the own vehicle to pass a preceding vehicle, and based on a positional relationship between lanes of the own vehicle and the preceding vehicle during the passing behavior, determine whether or not the passing behavior is unsafe.

An event may occur where the own vehicle attempts to pass the preceding vehicle in a no-passing zone. To prevent occurrence of such an event, it is desirable to restrict passing driving in the no-passing zone. For example, an alert may be provided via voice or the like. However, in some situations where the preceding vehicle to be passed is travelling, the alert provided to restrict passing driving may become unnecessary. Providing such an alert even after becoming unnecessary may cause a driver of the own vehicle to feel discomfort or the like. From such a point of view, there would be room for further improving or considering the above known techniques.

In consideration of the foregoing, exemplary embodiments of the present invention are directed to providing vehicle driving assistance techniques for providing an appropriate no-passing alert.

SUMMARY

In accordance with an exemplary embodiment of the present invention, there is provided a driving assistance apparatus including: a start determiner configured to determine whether or not during travel in a no-passing zone an own vehicle that is a vehicle carrying the apparatus has laterally moved from a rearward position to a lateral position relative to the preceding vehicle such that the own vehicle can accelerate from the lateral position to pass the preceding vehicle, and if it is determined that the own vehicle has laterally moved from the rearward position to the lateral position, then determine that the own vehicle has started passing driving; an alert controller configured to, if it is determined by the start determiner that the own vehicle has started passing driving in the no-passing zone, start alerting using an alert device at a start of passing driving; a situation determiner configured to determine whether or not a change of situation from a blocking situation to a non blocking situation has occurred after the start of passing driving; and an alerting stopper configured to, if it is determined by the situation determiner that the change of situation from the blocking situation to the non blocking situation has occurred, stop alerting using the alert device.

With the above configuration, if, during travel in the no-passing zone, the own vehicle laterally moves from a rearward position to a lateral position relative to the preceding vehicle and the own vehicle passes the preceding vehicle, alerting using the alert device will be started. If it is determined that the change of situation from the blocking situation to the non blocking situation has occurred, alerting using the alert device will be stopped. That is, if, after alerting using the alert device is started in the blocking situation, alerting using the alert device becomes unnecessary due to a change of positional relationship between the own vehicle and the preceding vehicle or a change of roadway situation around the own vehicle, alerting using the alert device will be stopped. In such a case, even after alerting using the alert device has been started to provide a no-passing alert, determination as to whether or not alerting is unnecessary is made. If it is determined that alerting is unnecessary, alerting using the alert device is stopped. This can prevent the driver of the own vehicle from feeling discomfort, thereby properly providing the no-passing alert.

DESCRIPTION OF SPECIFIC EMBODIMENTS

Hereinafter, embodiments of the invention will be described with reference to the accompanying drawings. A driving assistance system in accordance with one embodiment will now be described with reference to FIG. 1A. The driving assistance system 1 is mounted on a vehicle to perform a variety of driving assistance processing for assisting a vehicle's driver in driving the vehicle.

Figure 1A:
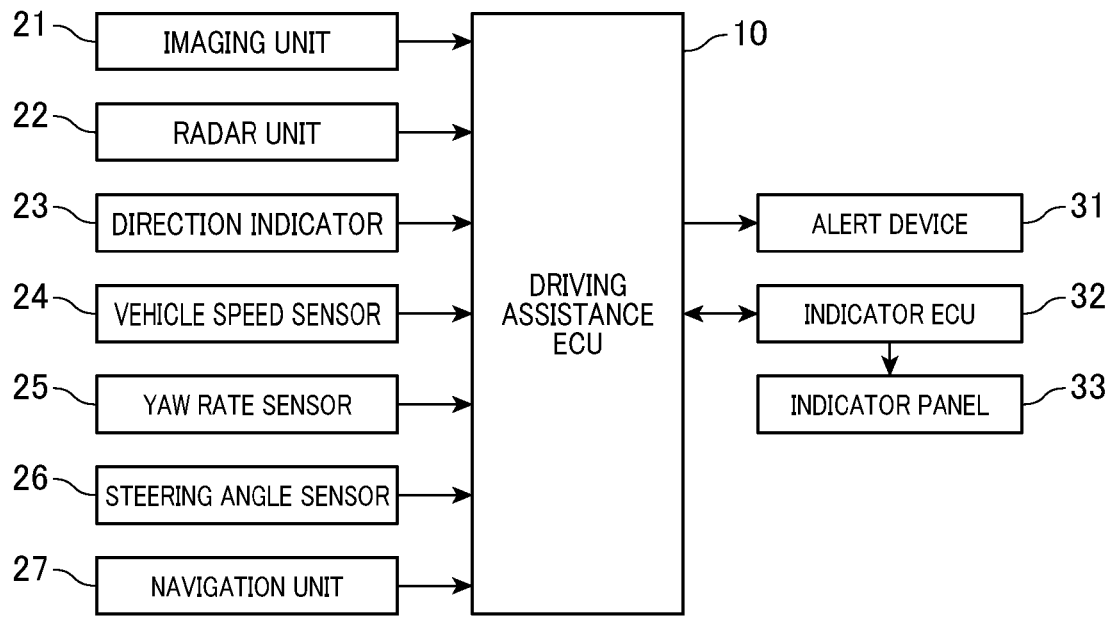
FIG. 1A is a block diagram of a driving assistance system in accordance with one embodiment of the present invention.

Referring to FIG. 1A, the driving assistance system 1 includes a driving assistance electronic control unit (ECU) 10 serving as a driving assistance apparatus. The driving assistance ECU 10 may be a microcomputer formed of a central processing unit (CPU), a read-only memory (ROM), a random-access memory (RAM), an input/output (I/O) interface, and other components.

Figure 1B:
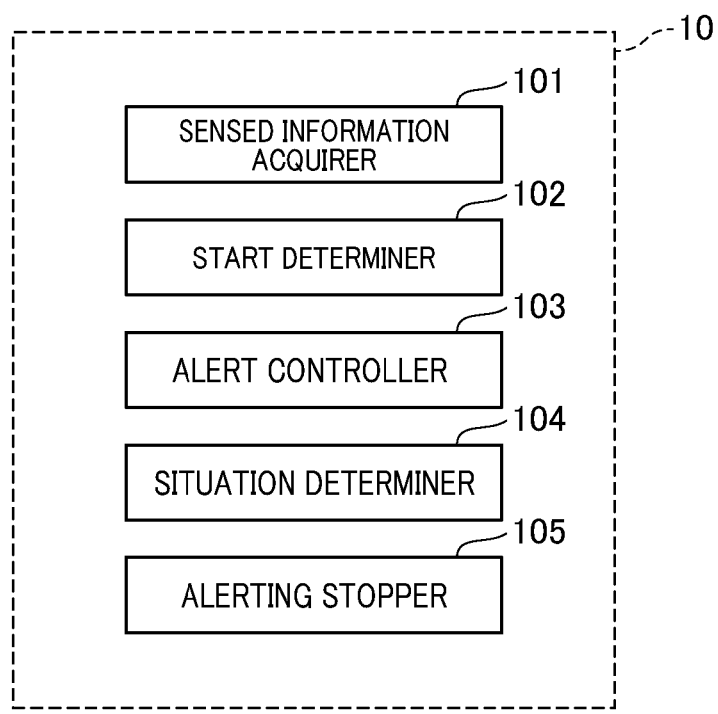
FIG. 1B is a functional block diagram of a driving assistance ECU.

As shown in FIG. 1B, the driving assistance ECU 10 includes, as functional blocks to perform situation determination processing (described later), sensed information acquirer 101, start determiner 102, alert controller 103, a situation determiner 104, and an alerting stopper 105. Functions of these blocks, which will be described later, may be implemented by the CPU of the driving assistance ECU 10 executing computer programs stored in the ROM.

The driving assistance system 1 includes an imaging unit 21, a radar unit 22, a direction indicator 23, a vehicle speed sensor 24, a yaw rate sensor 25, a steering angle sensor 26, and a navigation unit 27 that are operatively connected to the driving assistance ECU 10. Detection signals and a variety of information are fed to the driving assistance ECU 10.

The imaging unit 21 may include at least one of a charge-coupled device (CCD) camera, a CMOS image sensor, a near-infrared camera and the like. The imaging unit 21 captures an image of surroundings of the vehicle including a roadway in front of the vehicle to sequentially output image data of the captured image to the driving assistance ECU 10. The imaging unit 21 may be placed near the top end of a front windshield of the vehicle to capture an image of a front area that horizontally spans a pre-defined range of angles from an imaging axis. The imaging unit 21 may be a monocular camera or a stereoscopic camera.

The radar device 22 may include a millimeter-wave radar, a laser radar or the like, and is configured to transmit electromagnetic waves as transmit waves and receive their reflected waves to detect targets. The radar device 22 is placed at the front of the own vehicle to scan a front area that horizontally spans a pre-defined range of angles from a light axis with radar signals. The radar device 22 is configured to, based on an amount of time from emission of each electromagnetic wave to receipt of its reflected wave, produce ranging data and sequentially output the ranging data to the driving assistance ECU 10. The ranging data includes information for each detected target that is indicative of a direction, a distance and a relative speed of the detected target.

The direction indicator 23 is configured display a traveling direction of the own vehicle to the surroundings of the own vehicle. The direction indicator 23 includes an indicator stalk to be placed in a left-turn indicating position, a neutral position or a right-turn indicating position by the driver, and is configured to output an operation signal responsive to the position of the indicator stalk to the driving assistance ECU 10.

The vehicle-speed sensor 24 is provided along a rotary shaft for transferring dynamical power to vehicle wheels and is configured to output a detection signal responsive to a vehicle speed. The yaw rate sensor 25 may include a vibrator, such as a tuning fork or the like, and is configured to detect a yaw rate by detecting distortion of the vibrator base on a vehicle yaw moment. The steering angle sensor 26 is configured to detect a steering angle that is an angle of operation of a steering wheel. A running state (i.e., behavior) of the own vehicle can be detected based on outputs from these sensors 24-26.

An alert device 31 is operatively connected to the driving assistance ECU 10. The alert device 31 is configured to notify the driver that a potentially hazardous situation for the own vehicle has occurred or that a restricted action has been taken. The alert device 31 may include a speaker placed in a passenger compartment of the own vehicle and is configured to provide warning via voice or the like in response to a control command from the driving assistance ECU 10. Alternatively, the alert device 31 may include a display panel, such as a display, in an instrument panel. Still alternatively, the alert device 31 may be configured to provide warning by providing from a steering wheel, an accelerator pedal, a brake pedal or the like to the driver a vibration or a reaction force to a driving maneuver.

The driving assistance system 1 includes an indicator ECU 32 (as an indicator controller) for controlling display on an indicator panel 33 provided on an interior front side of the passenger compartment. The indicator ECU 32 is bidirectionally and communicatively connected to the driving assistance ECU 10. The indicator ECU 32 is configured to display on the indicator panel 33 information indicative of the vehicle speed, an engine revolution speed and the like of the own vehicle, and recognize traffic signs on a roadway to display the recognition results on the indicator panel 33 or on the display panel provided in the instrument panel. In the present embodiment, the indicator ECU 32 is configured to, based on the image data from the imaging unit 21, recognize via pattern matching the presence or absence of the traffic signs and types of the traffic signs. Alternatively, the driving assistance ECU 10 may be configured to recognize the traffic signs and output the recognition results to the indicator ECU 32.

The indicator ECU 32 is configured to display a traffic sign on the indicator panel 33 and then erase display of the traffic sign in response to a predefined erase condition. For example, the indicator ECU 32 erases display of the traffic sign when the own vehicle turns or when the own vehicle has traveled a predetermined distance since the start of display. Information about having erased display of the traffic sign is fed to the driving assistance ECU 10. Display of the traffic sign on the indicator panel 33 may include not only display of the traffic sign itself, but also display of symbols or characters indicating information of the traffic sign.

The own vehicle may travel in a no-passing zone where passing a preceding vehicle is restricted. The own vehicle may attempt to pass the preceding vehicle despite traveling in such a no-passing zone. In the present embodiment, when the own vehicle is traveling in the no-passing zone, the driving assistance ECU 10 determines whether or not the own vehicle is passing the preceding vehicle. If it is determined that the own vehicle is passing the preceding vehicle, then the alert device 31 provides warning.

In addition, the driving assistance ECU 10 is configured to determine the presence of a change of situation from a situation where passing driving is blocked to a situation where blocking the passing driving is unnecessary. The situation where passing driving is blocked is hereinafter referred to as a blocking situation. The situation where blocking the passing driving is unnecessary is hereinafter referred to as a non blocking situation. The driving assistance ECU 10 is configured to, if determining that the change of situation has occurred from the blocking situation to the non blocking situation, then stop alerting using the alert device 31.

Figure 2:
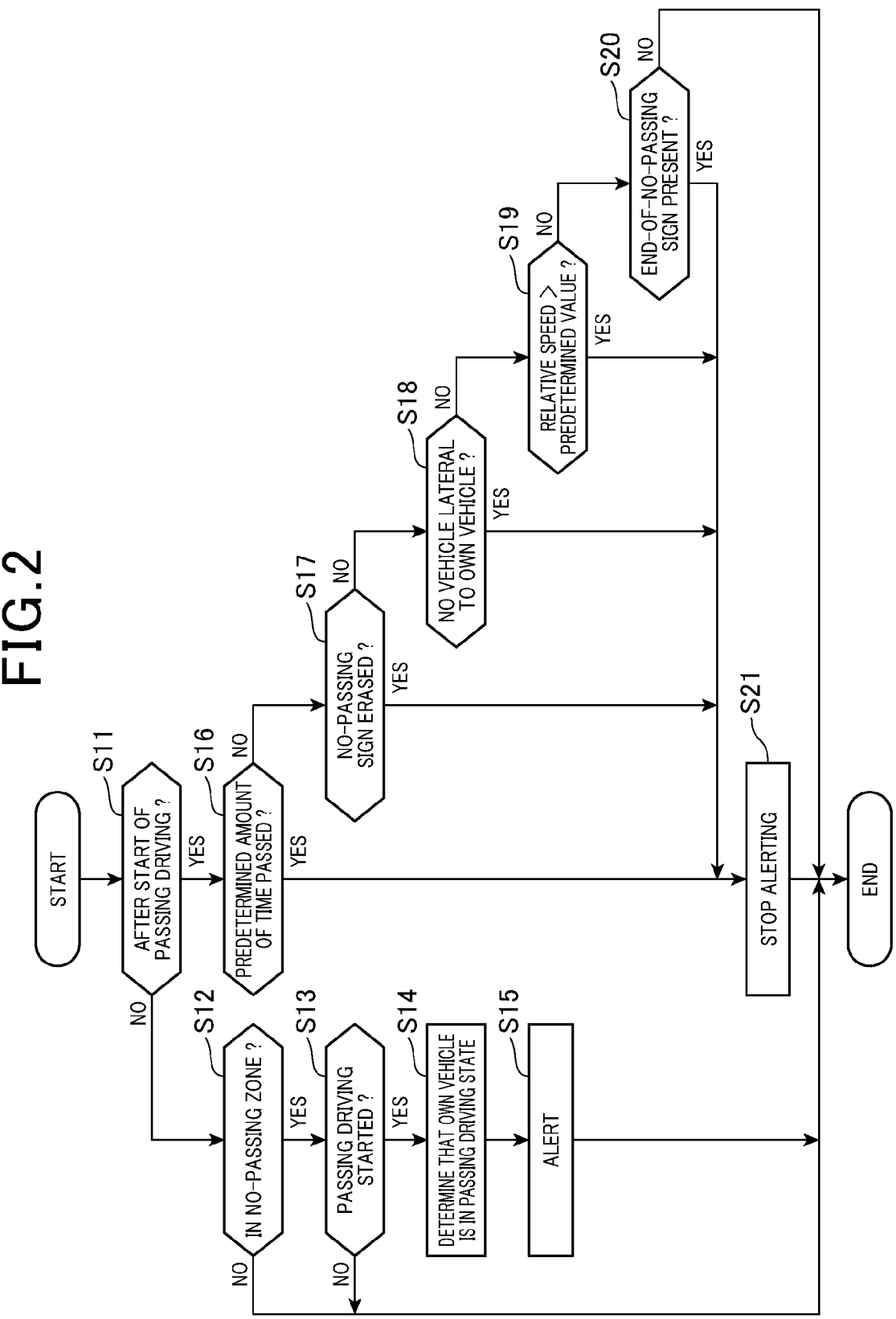
FIG. 2 is a flowchart of situation determination processing to be performed in the driving assistance ECU.

Situation determination processing to be performed in the driving assistance ECU 10 will now be described with reference to FIG. 2. The situation determination processing is iteratively performed every predetermined time interval during travel of the own vehicle.

In step S11, the driving assistance ECU 10 (as the situation determiner 104) determines whether or not passing driving of the own vehicle in a no-passing zone has been already started. If in step S11 it is determined that passing driving of the own vehicle in a no-passing zone has not been started yet, then the process flow proceeds to step S12. In step S12, the driving assistance ECU 10 (as the start determiner 102) determines whether or not the own vehicle is traveling in the no-passing zone. The determination as to whether or not the own vehicle is traveling in the no-passing zone is made based on identification of a traffic sign indicating the no-passing zone from the image data of traffic signs captured by the imaging unit 21. If such a traffic sign is identified in the indicator ECU 32, the driving assistance ECU 10 (as the sensed information acquirer 101) acquires sensed information of the traffic sign, and the driving assistance ECU 10 (as the start determiner 102) determines that the own vehicle is traveling in the no-passing zone. If in step S12 it is determined that the own vehicle is traveling in the no-passing zone, then the process flow proceeds to stop S13.

In step S13, the driving assistance ECU 10 (as the start determiner 102) determines whether or not passing driving of the own vehicle has been started. Criteria for determining that passing driving of the own vehicle has been started include the following first to fourth conditions. The first condition is provided to determine that a preceding vehicle to be passed is present. The first condition includes the speed of the own vehicle being equal to or greater than a predetermined speed (e.g., 30 km/h), a distance between the preceding vehicle and the own vehicle in a traveling direction of the own vehicle being equal to or less than a predetermined distance (e.g., 70 m), a lateral position of the preceding vehicle relative to the own vehicle being within a predetermined range (i.e., a lane width of the own traveling lane), and a relative speed of the own vehicle with respect to the preceding vehicle being within a predetermined range.

The second condition is provided to determine that a lane change has been performed by the own vehicle, that is, that the own vehicle has laterally moved from a rearward position to a lateral position relative to the preceding vehicle such that the own vehicle can accelerate from the lateral position to pass the preceding vehicle. The second condition includes occurrence of the turn signal on the opposite hand side to the hand of traffic, an amount of lateral movement of the own vehicle for a predetermined time period after turning on of the turn signal being equal to or greater than a predetermined value (e.g., 1.5 m) required to perform the lane change, and a direction of the lateral movement coinciding with a direction indicated by the turn signal.

The third condition is provided to determine that the preceding vehicle to be passed is present as a vehicle lateral to the own vehicle. The third condition includes a lateral position of the preceding vehicle relative to the own vehicle being within a predetermined range. More specifically, the third condition includes a lateral distance from a reference position of the lateral center of the own vehicle to the preceding vehicle being greater than a lower limit of the range that allows the own vehicle to pass the preceding vehicle from the rearward and lateral position relative to the preceding vehicle and less than an upper limit of the range that ensures that the own vehicle is not too laterally far away from the preceding vehicle. The predetermined range is from 2 to 5 m.

The fourth condition is provided to, based on at least one of a lateral distance between the own vehicle and the preceding vehicle and a relative speed of the own vehicle with respect to the preceding vehicle, determine that the own vehicle is in the passing driving state allowing the own vehicle to pass the preceding vehicle. The fourth condition includes the speed of the own vehicle exceeding that of the preceding vehicle by a predetermined value or more.

If in step S13 it is determined that passing driving of the own vehicle has been started, the process flow proceeds to step S14. In step S14, the driving assistance ECU 10 (as the start determiner 102) determines that the own vehicle is in the passing driving state and sets a passing flag ON to indicate that the own vehicle is in the passing driving state. Subsequently, in step S15, the driving assistance ECU 10 (as the alert controller 103) alerts the driver via the alert device 31 of occurrence of a situation that passing driving in the no-passing zone has been started. Thereafter, the process flow ends. If the passing flag is set ON, traveling of the own vehicle may be restricted, in addition to starting the alert. If No is determined in any one of steps S12, S13, then the process flow ends.

If in step S11 it is determined that passing driving of the own vehicle in a no-passing zone has been already started, then in respective steps S16 to S20, the driving assistance ECU 10 (as the situation determiner 104) determines whether or not a change of situation has occurred from a situation where passing driving is blocked (i.e., the blocking situation) to a situation where blocking the passing driving is unnecessary (i.e., the non blocking situation). If it is determined that such a change of situation has occurred, that is, in any one of steps S16-S20 it is determined that such a change of situation has occurred, then the process proceeds to step S21, where the driving assistance ECU 10 (as the alerting stopper 105) stops alerting using the alert device 31. Steps S16-S20 will now be described in more detail.

In step S16, the driving assistance ECU 10 (as the situation determiner 104) determines whether or not a predetermined amount of time has passed since the start of alerting. The predetermined amount of time may be defined taking into account a time required to complete the passing maneuver, and may be set to, for example, fine seconds. If in step S16 it is determined that the predetermined amount of time has passed since the start of alerting, then the process proceeds to step S21.

In step S17, the driving assistance ECU 10 (as the situation determiner 104) determines whether or not display of the no-passing sign on the indicator panel 33 has been erased. As mentioned above, during traveling in the no-passing zone, the no-passing sign is displayed on the indicator panel 33 under control of the indicator ECU 32. If the predefined erase condition is met in the indicator panel 33, display of the no-passing sign is erased. Based on the no-passing sign displayed on the indicator panel 33 having been erased, YES is determined in step S17.

In step S18, the driving assistance ECU 10 (as the situation determiner 104) determines whether or not the preceding vehicle has left the lateral position relative to the own vehicle. Determination as to whether or not the preceding vehicle has left the lateral position relative to the own vehicle is made based on the image data from the imaging unit 21. If in step S18 it is determined that the preceding vehicle has left the lateral position relative to the own vehicle, then the process flow proceeds to step S21.

In step S19, the driving assistance ECU 10 (as the situation determiner 104) determines whether or not the speed of the own vehicle falls below that of the preceding vehicle by a predetermined value or more, that is, whether or not a relative speed of the preceding vehicle with respect to that of the own vehicle is equal to or greater than the predetermined value. If in step S19 it is determined that the speed of the own vehicle falls below that of the preceding vehicle by the predetermined value or more, then the process flow proceeds to step S21. Alternatively, if in step S19 it is determined that the speed of the own vehicle has continued to be lower than that of the preceding vehicle by the predetermined value or more for a predetermined time of period or more, then the process flow proceeds to step S21.

In step S20, the driving assistance ECU 10 (as the situation determiner 104) determines whether or not an end-of-no-passing sign indicating removal of the restriction on passing has been identified. The driving assistance ECU 10 may acquire image data of traffic signs captured by the imaging unit 21 and may identify the end-of-no-passing sign based on the acquired image data. In an alternative embodiment where the traffic signs are identified in the indicator ECU 32, the driving assistance ECU 10 may determine whether or not the restriction on passing has been removed or cleared based on sensed information of the traffic signs acquired from the indicator ECU 32. If in step S20 it is determined that the end-of-no-passing sign has been identified, then the process flow proceeds to step S21.

The vehicle driving assistance apparatus of the present embodiment configured as above can provide the following advantages.

With the above configuration, if the own vehicle is traveling in the no-passing zone, the own vehicle laterally moves from a rearward position to a lateral position relative to the preceding vehicle, and if the own vehicle passes the preceding vehicle, alerting using the alert device 31 will be started. if it is determined that the change of situation from the blocking situation to the non blocking situation has occurred, alerting using the alert device 31 will be stopped. that is, if, after alerting using the alert device 31 is started in the blocking situation, alerting using the alert device 31 becomes unnecessary due to a change of positional relationship between the own vehicle and the preceding vehicle or a change of surrounding roadway situation, alerting using the alert device 31 will be stopped. In such a case, even after alerting using the alert device 31 has been started to provide a no-passing alert, determination as to whether or not alerting is unnecessary is made. If it is determined that alerting is unnecessary, alerting using the alert device 31 is stopped. This can prevent the driver of the own vehicle from feeling discomfort, thereby properly providing the no-passing alert.

The driving assistance ECU 10 is configured to, based on the image data acquired from the imaging unit 21, detect and recognize the no-passing sign indicating the restriction on passing and the end-of-no-passing sign indicating removal of the restriction on passing provided along the roadway, which allows determination as to whether alerting is necessary or unnecessary to be properly made. This can prevent providing unnecessary alerts regarding the restriction on passing.

Display of the no-passing sign on the indicator panel 33 is erased when the own vehicle turns or when the own vehicle has traveled a predetermined distance since the start of display. If alerting is continued even after display of the no-passing sign has been erased, inconsistency between display on the indicator panel 33 and the alert provided by the alert device 31 may cause the driver to feel discomfort. To prevent occurrence of such a situation, in the present embodiment, the alert regarding the restriction on passing is removed when display of the no-passing sign on the indicator panel 33 is erased. This can prevent the unnecessary alert regarding the restriction on passing from being provided.

If after the start of passing driving the speed of the own vehicle falls below that of the preceding vehicle by the predetermined value or more, it becomes impossible for the own vehicle to pass the preceding vehicle due to an increasing distance between the own vehicle and preceding vehicle. In such a case, the alert regarding the restriction on passing will be removed or cleared. This can prevent providing the unnecessary alert regarding the restriction on passing.

If after the start of passing driving the preceding vehicle has left the lateral position relative to the own vehicle, it becomes impossible for the own vehicle to pass the preceding vehicle due to disappearance of the vehicle to be passed. In such a case, the alert regarding the restriction on passing is removed or cleared. This can prevent providing the unnecessary alert regarding the restriction on passing.

If after the start of passing driving alerting using the alert device 31 has continued for the predetermined amount of time or more, it is likely that passing driving is already completed. In such a case, the alert regarding the restriction on passing is removed or cleared, thereby preventing an excessively long alert regarding the restriction on passing from being implemented.

Modifications

There will now be explained some modifications that may be devised without departing from the spirit and scope of the present invention.

(1) In an alternative embodiment, if, after the start of passing driving, it is determined based on a relative position of the own vehicle with respect to the preceding vehicle that the change of situation from the blocking situation to the non blocking situation has occurred, then alerting using the alert device 31 may be stopped. In such a case, for example, if the relative position of the own vehicle with respect to the preceding vehicle changes such that the own vehicle travels progressively away from the preceding vehicle, it may be determined that the change of situation from the blocking situation to the non blocking situation has occurred.

(2) In an alternative embodiment, if, after the start of passing driving, the own vehicle has returned to the rearward position with respect to the preceding vehicle without passing the preceding vehicle, it may be determined that the change of situation from the blocking situation to the non blocking situation has occurred, and then alerting using the alert device 31 may be stopped. In such a case, for example, if, after the start of passing driving and before the own vehicle passes the preceding vehicle, the turn signal has occurred on the same hand side as the hand of traffic (i.e., on the preceding-vehicle's traveling lane side) or the steering angle has changed by a predetermined angle or more on the traveling lane side), then alerting using the alert device 31 may be stopped.

(3) In an alternative embodiment, if based on navigation information from the navigation unit 27 it is determined by the driving assistance ECU 10 that the own vehicle travels from inside to outside the no-passing zone, it may be determined that the change of situation from the blocking situation to the non blocking situation has occurred, and then alerting using the alert device 31 may be stopped.

What is claimed is:

1. A driving assistance apparatus comprising:
a start determiner configured to determine whether or not during travel in a no-passing zone an own vehicle that is a vehicle carrying the apparatus has laterally moved from a rearward position to a lateral position relative to a preceding vehicle such that the own vehicle can accelerate from the lateral position to pass the preceding vehicle, and if it is determined that the own vehicle has laterally moved from the rearward position to the lateral position, then determine that the own vehicle has started passing driving;
an alert controller configured to, if it is determined by the start determiner that the own vehicle has started passing driving in the no-passing zone, start alerting using an alert device at a start of passing driving;
a situation determiner configured to determine whether or not a change of situation from a blocking situation to a non blocking situation has occurred after the start of passing driving, the blocking situation being a situation where passing driving is blocked, the non blocking situation being a situation where blocking the passing driving is unnecessary; and
an alerting stopper configured to, if it is determined by the situation determiner that the change of situation from the blocking situation to the non blocking situation has occurred, stop alerting using the alert device.

2. The apparatus of claim 1, further comprising a sensed information acquirer configured to acquire sensed information of traffic signs;
   the start determiner is configured to, based on sensed information of a no-passing sign included in the sensed information of traffic signs, determine that passing driving in the no-passing zone has been started,
   the situation determiner is configured to, if, after passing driving in the no-passing zone has been started, sensed information of an end-of-no-passing sign is included in the sensed information of the traffic signs, determine that the change of situation from the blocking situation to the non blocking situation has occurred.

3. The apparatus of claim 1, wherein
   the apparatus is operatively connected to an indicator controller configured to recognize traffic signs and display the recognized traffic signs on a display unit visible to a driver of the own vehicle, and then erase display of each recognized traffic sign in response to a predefined erase condition, and
   the situation determiner is configured to, if, after the start of passing driving, a no-passing sign as one of the traffic signs displayed on the display unit has been erased, determine that the change of situation from the blocking situation to the non blocking situation has occurred.

4. The apparatus of claim 1, wherein the predefined erase condition includes the own vehicle having turned or the own vehicle having traveled a predetermined distance since the start of display.

5. The apparatus of claim 1, wherein the situation determiner is configured to, if, after the start of passing driving, a speed of the own vehicle falls below that of the preceding vehicle by the predetermined value or more, determine that the change of situation from the blocking situation to the non blocking situation has occurred.

6. The apparatus of claim 1, wherein the situation determiner is configured to, if, after the start of passing driving, the preceding vehicle has left the lateral position relative to the own vehicle, determine that the change of situation from the blocking situation to the non blocking situation has occurred.

7. The apparatus of claim 1, wherein the situation determiner is configured to, if, after the start of passing driving, a predetermined amount of time has passed since start of alerting using the alert device, determine that the change of situation from the blocking situation to the non blocking situation has occurred.

8. A vehicle driving assistance method comprising:
   a step of determining whether or not during travel in a no-passing zone an own vehicle has laterally moved from a rearward position to a lateral position relative to a preceding vehicle such that the own vehicle can accelerate from the lateral position to pass the preceding vehicle, and if it is determined that the own vehicle has laterally moved from the rearward position to the lateral position, then determining that the own vehicle has started passing driving;
   a step of, if it is determined that the own vehicle has started passing driving in the no-passing zone, starting alerting using an alert device at start of passing driving;
   a step of determining whether or not a change of situation from a blocking situation to a non blocking situation has occurred after the start of passing driving, the blocking situation being a situation where passing driving is blocked, the non blocking situation being a situation where blocking the passing driving is unnecessary; and
   a step of, if it is determined that the change of situation from the blocking situation to the non blocking situation has occurred, stopping alerting using the alert device.

* * * * *